(12) United States Patent
Kim et al.

(10) Patent No.: US 6,292,189 B1
(45) Date of Patent: Sep. 18, 2001

(54) APPARATUS AND METHOD OF DATA BACKUP USING A VIDEO TAPE RECORDER

(75) Inventors: Chul-min Kim; Byeong-ill Kim, both of Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/196,352

(22) Filed: Nov. 19, 1998

(30) Foreign Application Priority Data

Nov. 20, 1997 (KR) .................................................. 97-61311
Nov. 24, 1997 (KR) .................................................. 97-62331

(51) Int. Cl.[7] ...................................................... G06F 15/00
(52) U.S. Cl. ............................................................ 345/419
(58) Field of Search ................................... 345/418, 419; 386/68, 81, 111, 123, 22, 35

(56) References Cited

U.S. PATENT DOCUMENTS 5,758,013 * 5/1998 Kizu et al. ........................... 386/123

6,097,877 * 8/2000 Katayama et al. .................... 386/68

* cited by examiner

*Primary Examiner*—Phu K. Nguyen
(74) *Attorney, Agent, or Firm*—Sughrue, Mion, Zinn, Macpeak & Seas, PLLC

(57) ABSTRACT

Apparatus and method of data backup using a video tape recorder (VTR) where a backup composite video signal is generated by adding horizontal and vertical synchronous signals to digital data received from a host computer via a communication port, the backup composite video signal or an actual composite video signal input via an input connector of the VTR is selectively switched and input/output in accordance with a selection control signal, and the switched input is recorded/reproduced onto/from the video tape in accordance with a predetermined magnetic recording/reproducing method, thereby integrating data backup function and the unique function of the VTR. An operation mode of the VTR is switched in accordance with commands from the host computer. In addition, a luminance signal is frequency modulated to the frequency band extended up to those for a chrominance signal so that further more amount of backup data can be recorded onto the video tape.

19 Claims, 10 Drawing Sheets

Horizontal synchronous period

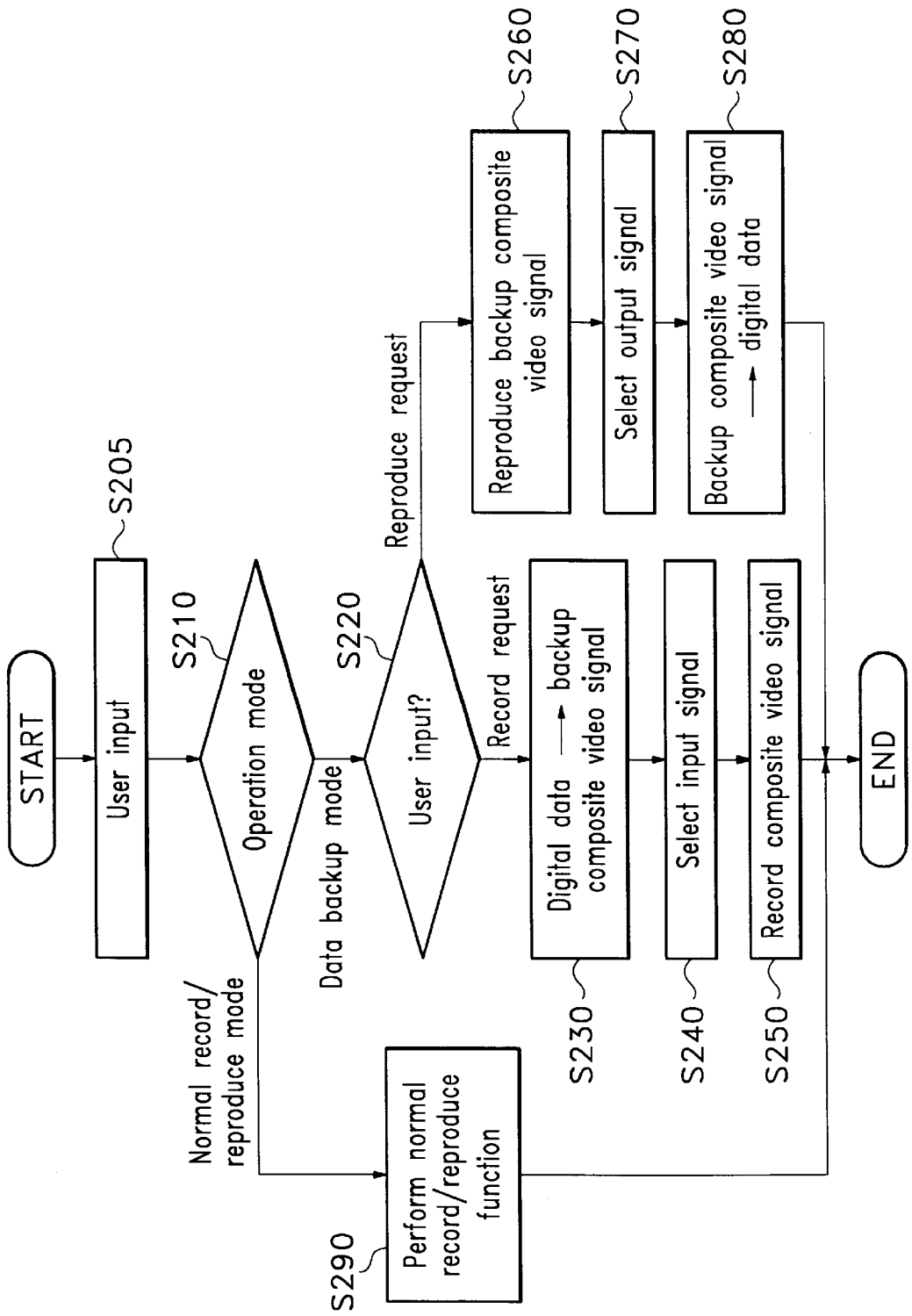

APPARATUS AND METHOD OF DATA BACKUP USING A VIDEO TAPE RECORDER

BACKGROUND OF THE INVENTION

1. Field of the Invention

The present invention relates to an apparatus and a method of data backup using a video tape recorder, and more particularly to an apparatus and a method of data backup using a video tape recorder in which a backup function for converting a digital data of a host computer into a video signal and recording/reading onto/from a video tape and a unique function of the video tape recorder are integrated.

2. Description of the Related Art

Recently, substantial changes have occurred in a memory device for storing personal computer (PC) data in accordance with a development in personal computer technology. floppy disks and hard disks are widely used memory devices in a PC. Generally, the hard disk has a storage capacity extremely larger than those of other memory device. However, the hard disk is easily damaged by an electrical or physical impact.

Generally, because a single PC uses a single hard disk, the data in the hard disk needs to be periodically stored into an auxiliary memory device in order to protect the data stored in the hard disk from any accidental erasure. As examples of auxiliary memory device, there is an optical disk, a tape driver, and the like. However, such auxiliary memory device is expensive.

Generally, a video tape recorder is designed in a fashion that a video and an audio signals are recorded or read onto or from a video tape, i.e., a magnetic recording medium. It is a common practice that the video tape recorder is not provided with an additional function of storing data.

However, a medium or a large sized computer, or a workstation level computer, uses a tape driver which adapts a magnetic recording method and is added as an external data backup device. A lot of studies on the apparatus for backup of digital data using a video tape that adapts similar recording method have been performed.

A conventional data backup device using a video tape will be explained with reference to FIG. 1.

FIG. 1 shows a structure of the PC tape backup system of the Danmere Limited Co. of England.

Danmere Limited Co. produces a data backup system which uses a video tape recorder called "Backer 32", as a PC tape backup system.

To set a data backup system using the Backer 32, a PC interface card 10, i.e., an 8-bit industry standard architecture (ISA) type PC expansion card of model number "DANB100D", has to be installed in an expansion slot of a PC (or a host computer) 100. In addition, an external install type backup module 11, i.e, model number "DANF100B", is needed. An input/output connector of a video tape recorder (VTR, or a camera recorder) 200 is used for connecting the backup module 11 to the VTR 200. In addition, the Backer software of the Danmere has to be installed in the PC 100 so as to operate the PC interface card 10 and the backup module 11.

The PC interface card 10 and the backup module 11 receive backup data from the PC 100, add horizontal and vertical synchronous signals to them, convert them into a composite video signal, and input them to the VTR 200 via the input connector of the VTR 200.

Then, the VTR 200 records the backup composite video signal which is input from the backup module 11 onto a video tape using a method same as those by which the original composite video signal is recorded. The VTR 200 subsequently reads the backup composite video signal from the video tape in accordance with a request from the backup module 11 by a method same as those by which the original composite video signal is read, and provides the read signal to the backup module 11. That is, a backup composite video signal which can be obtained by converting the backup data is recorded and reproduced by a method same as those by which the original video signal input from an external device.

A user may generate a template of a file to be copied to a video tape via a graphic user interface. The template can occupy of an overall hard disk, directory,. or a file, or include a multiple directory.

The storage capacity of the Backer varies according to operation modes. Modes 1 and 2 allow recording performance of 9 megabytes per minute and 4 megabytes per minute, respectively. This means that data of 2 gigabytes and 1 gigabyte can be recorded onto a single video tape which has 4-hour recording capacity.

The conventional video tape data backup system has some problems. First, a PC interface card which functions similarly to "DANB100D" of Danmere has to be additionally installed into the expansion slot of the PC. Moreover, unnecessary space is required for the connection between the backup module 11 and the VTR 200. Furthermore, an additional power adapter 12 is needed for operating the backup module 11.

To connect a conventional video tape data backup device to a new PC, a PC interface card is detached from a PC and mounted onto the new PC. Then, a cabling work where the install type backup module is connected to a VTR and the new PC, has to be performed.

In such a conventional video tape data backup device, a user has to operate an application program of the host computer 100 if he/she intends to select a predetermined data of the host computer 100 and to backup the data onto the VTR 200. In addition, the user has to manually operate, record and reproduce buttons of the VTR 200. The trick functions such as fast forward, rewind, pause, and stop are controlled directly using a control panel of the VTR 200.

These operations are very cumbersome and the working efficiency of the video tape data backup device is deteriorated.

The conventional video tape data backup device receives backup data from a computer, adds horizontal and vertical synchronous signals to them, modulates the signals into a composite video signal, and stores (records) the result onto a video tape. Here, a pseudo composite video signal obtained by modulating the backup data is recorded onto a video tape by a low frequency conversion recording method by which an actual video signal input from an external device is recorded. The low frequency conversion recording method is that a luminance signal (Y) and a chrominance signal (C) are isolated from the video signal, and the luminance signal is frequency modulated while the chrominance signal is low frequency converted. Then, the two signals are superposed and recorded.

At this time, the backup composite video signal obtained by modulating the backup data is those as modulated by using only a luminance signal. The backup composite video signal includes horizontal and vertical synchronous signals. However, a modulation signal for the luminance signal is included while those for the chrominance signal is not included in the backup composite video signal.

This means that the frequency band for recording the luminance signal can be extended up to those allocated for the chrominance signal when data backup is performed. That is, the luminance signal can be frequency modulated to the frequency band which is extended up to those for chrominance signal, and recorded.

Functions for presenting a signal are enhanced as the frequency bandwidth becomes wider when the frequency modulation (FM) is performed. If the luminance signal is frequency modulated to the extended frequency band and recorded, the backup data of further increased amount can be recorded onto the video tape having a similar recording capacity.

However, the conventional video tape data backup device frequency modulates the luminance signal to the frequency band same as those for recording a common video signal and records the same when the data backup is performed. Therefore, the recording space of the video tape is not efficiently utilized, which causes a great loss of the amount of data record.

SUMMARY OF THE INVENTION

It is therefore an object of the present invention to provide an apparatus and a method of data backup device using a video tape recorder (VTR), where a backup data recording/reproduction function for converting digital data of a personal computer into a composite video signal so as to be recorded onto a video tape and the unique recording/reproducing function of the VTR are integrated, thus the apparatus can be easily installed, moved, and does not require an additional space for installation.

It is another object of the present invention to provide an apparatus and a method of data backup using a VTR where a luminance signal is frequency modulated to a frequency band which is expanded up to the frequency band used for a chrominance signal and recorded when the data backup is performed, so as to record an increased amount of backup data onto a video tape.

It is still another object of the present invention to provide an apparatus and a method of data backup using a VTR where a host computer directly controls a central processing unit of a data backup apparatus by transmitting a predetermined command to the data backup apparatus through a communication cable so that the data backup apparatus can operate in record or reproduce mode without manual operation of a user.

To achieve the above objects of the present invention, there is provided an apparatus and a method of data backup using a VTR wherein digital data of a host computer is backup onto a video tape, the digital data is input from the host computer via a communication port and vertical and horizontal synchronous signals are added to the digital data so as to generate a backup composite video signal, and either the actual composite video signal input by an input connector of the VTR or the backup composite video signal is selected in accordance with a selection control signal and is output, and the selected signal is recorded/ reproduced onto/from the video tape according to a predetermined magnetic recording/reproducing method, to thereby integrate a data backup function with a unique function of the VTR.

In addition, a luminance signal and a chrominance signal are respectively separated from the video signal by a luminance/chrominance signal separator unit. The luminance signal is then frequency modulated by a frequency modulator (FM) unit and the chrominance signal is low frequency converted by a low frequency converter unit. Then, the two signals are recorded in a superposed fashion. The backup composite video signal obtained by modulating the backup data using a data modulator unit is recorded onto the video tape in accordance with the superposed recording method. Here, the chrominance signal is selectively removed by a chrominance signal remover unit according to a mode selected by a user. The luminance signal is frequency modulated to a first or a second frequency band having different bandwidth.

Here, the second frequency band is for the luminance signal in a data backup mode, and includes the first frequency band for luminance signal and a frequency band for chrominance signal in a normal record/reproduce mode.

If an actually effective luminance signal among the backup composite video signals is frequency modulated to the frequency band which is expanded to those for the chrominance signal and recorded when data backup is performed, more amount of backup data can be recorded onto the video tape.

Preferably, the FM unit includes a first FM unit for frequency modulating the luminance signal to the first frequency band, a second FM unit for frequency modulating the luminance signal to the second frequency band, and a switch unit which switches in accordance with a mode selected by a user so as to input the luminance signal to the first or second FM unit.

A conventional VTR has a band pass filter unit for filtering the frequency modulated luminance signal to a predetermined frequency band. Similarly, the VTR of the present invention includes a band pass filter for filtering the luminance signal output from the FM unit to the first or second frequency band in accordance with a mode selected by a user.

Accordingly, the band pass filter preferably includes a first band pass filter unit for filtering the luminance signal output from the first FM to the first frequency band, and a second band pass filter unit for filtering the luminance signal output from the second FM unit to the second frequency band.

In the present invention, a mechanism driver unit is controlled by a mechanism control command obtained from a predetermined signal input from the host computer so that the backup data can be recorded/reproduced in record/ reproduce mode.

BRIEF DESCRIPTION OF THE DRAWINGS

The above object and other advantages of the present invention will become more apparent by describing in detail the preferred embodiments thereof with reference to the accompanying drawings, in which:

FIG. 11 is a flow diagram showing a data backup method using a VTR according to embodiment 7 of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having skill in the art.

Figure 1:
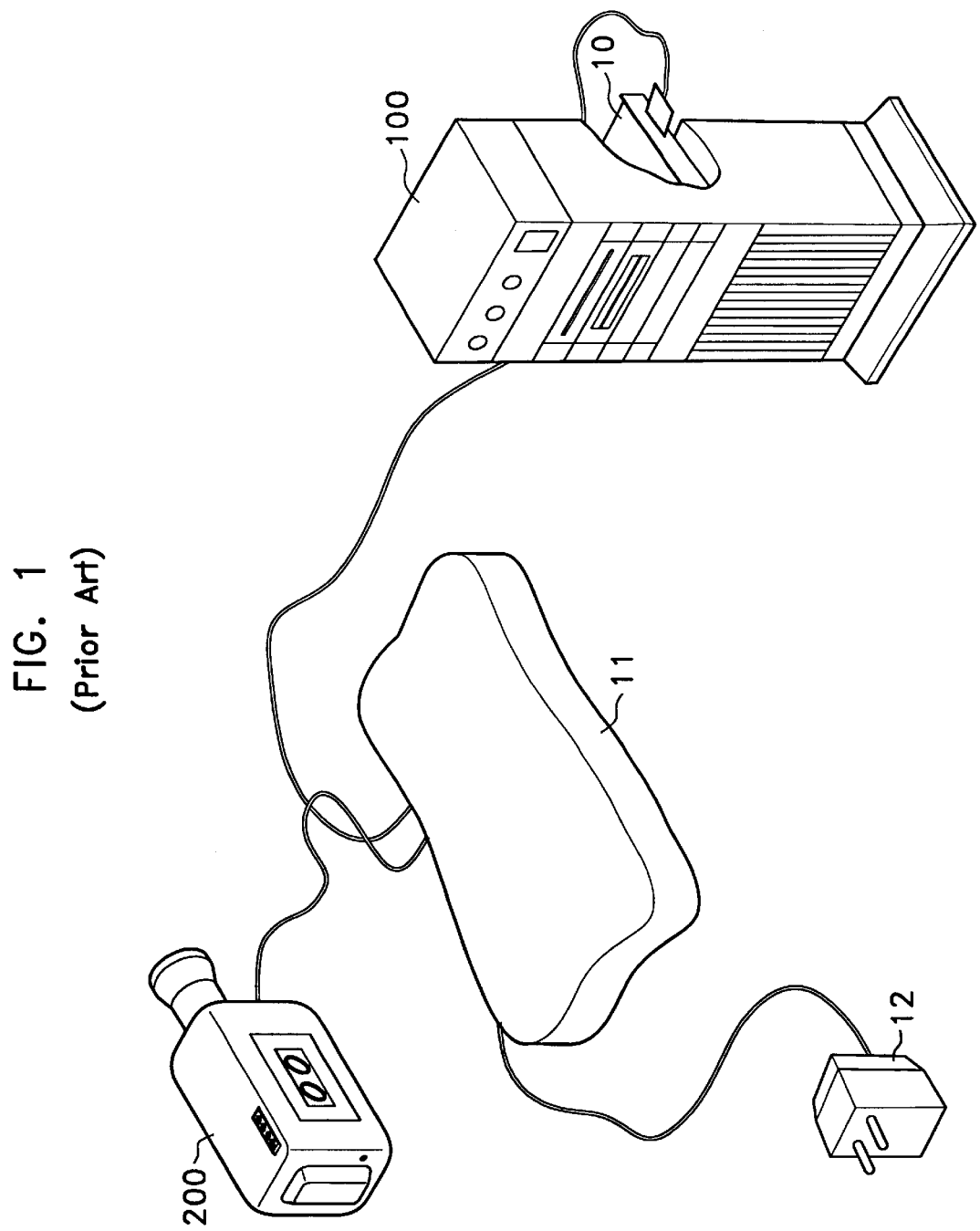
FIG. 1 shows the configuration of the video tape data backup system of Danmere Limited Co. of England.
Figure 2:
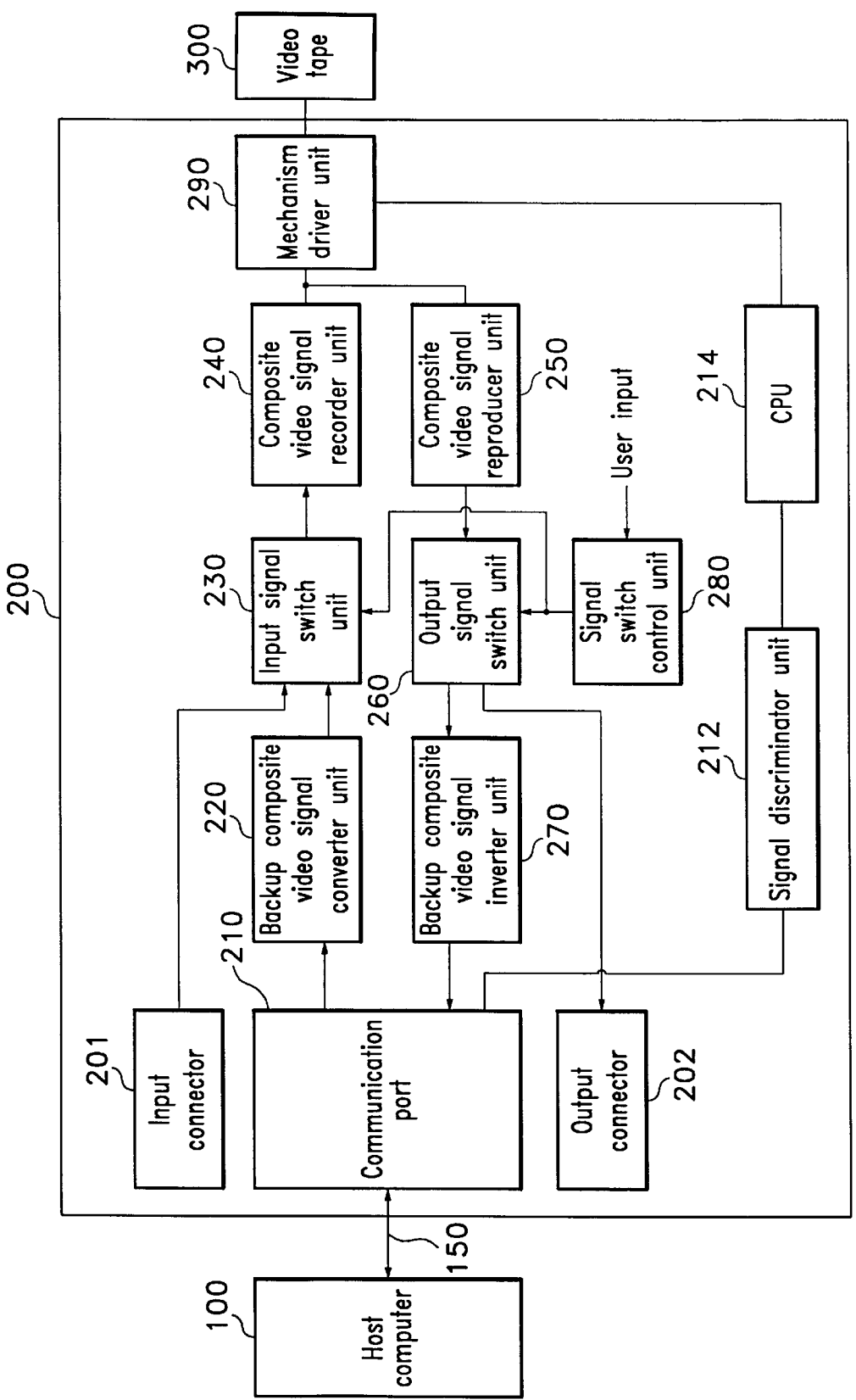
FIG. 2 is a block diagram showing a data backup apparatus using a VTR according to embodiment 1 of the present invention.

FIG. 2 is a block diagram showing a data backup apparatus using VTR according to embodiment 1 of the present invention.

Figure 3:
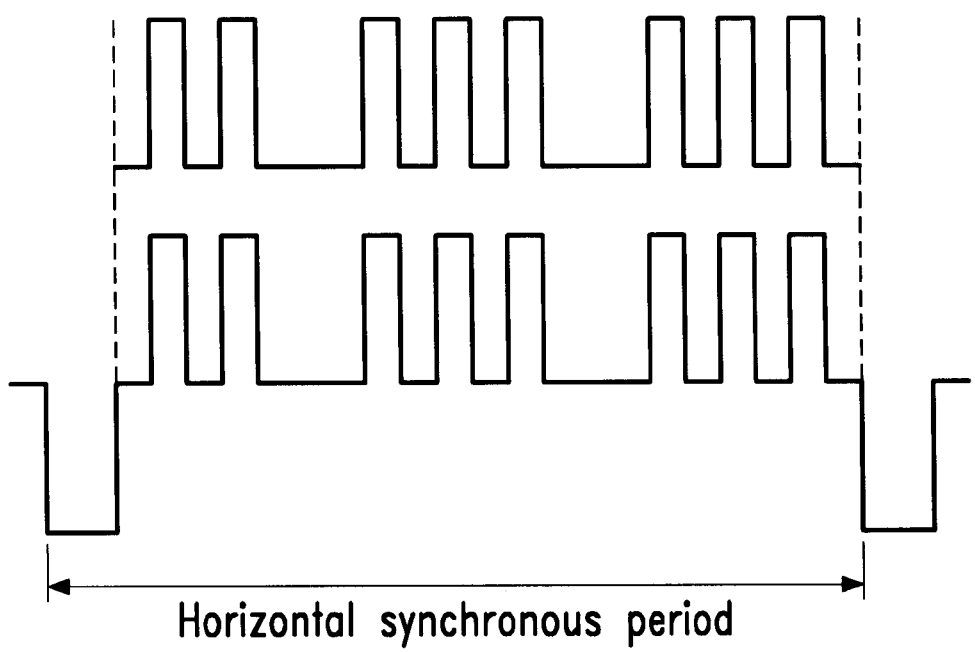
FIG. 3 shows a horizontal synchronous signal added to a bit stream of digital data.

Referring to FIG. 2, in a data backup apparatus using a VTR where digital data of the host computer 100 is backup to a video tape 300, a backup composite video signal converter unit 220 receives digital data input from the host computer 100 via a communication port 210 used for an electrical connection with the host computer 100. Then, as shown in FIG. 3, the backup composite video signal converter unit 220 converts the digital data into a composite video signal by adding horizontal and vertical synchronous signals to the received digital data.

A communication cable 150 is structured such that the host computer 100 can transmit/receive digital data (i.e., backup data) and a predetermined mechanism control command to/from the VTR 200. The mechanism control command is those issued from the host computer 100 to the VTR 200 for the purpose of controlling a mechanism driver unit 290, and includes reproduce, record and trick commands. Here, the trick command is for such functions as fast forward, rewind, pause, and stop of the VTR 200.

The input signal switch unit 230 is connected to the backup composite video signal converter unit 220 and to the input connector 201, and selectively switches and outputs either the backup composite video signal input from the backup composite video signal switch unit 220 or the actual composite video signal input via the input connector 201 of the VTR 200 in accordance with a selection control signal applied from a signal switch control unit 280 which will be discussed later.

The composite video signal recorder unit 240 receives the output from the input signal switch unit 230 and records the same onto the video tape 300 in accordance with the magnetic recording method which will be described later.

If the operation mode determined by a combination of selection control signals applied to the input signal switch unit 230 is a data backup mode by which the digital data of the host computer 100 is recorded onto the video tape 300 or the backup data recorded onto the video tape 300 is reproduced, the composite video signal recorder unit 240 records the backup composite video signal onto the video tape 300. If the operation mode is a normal record/reproduce mode by which the actual composite video signal is recorded onto the video tape 300 or the actual composite video signal recorded onto the video tape 300 is reproduced, the composite video signal recorder unit 240 records the actual composite video signal onto the video tape 300.

A composite video signal reproducer unit 250 reproduces a composite video signal from the video tape 300 in accordance with a predetermined reproducing method.

An output signal switch unit 260 is connected to the composite video signal reproducer unit 250 and selectively switches and outputs an output of the composite video signal reproducer unit 250 in accordance with a selection control signal input by a user.

A backup composite video signal inverter unit 270 receives an output from the output signal switch unit 260, inverts the same into digital data by eliminating horizontal and vertical synchronous signals, and outputs the digital data to the host computer 100 via the communication port 210.

If an operation mode determined by a combination of the selection control signal applied to the output signal switch unit 260 is a data backup mode, the composite video signal reproducer unit 250 reproduces the backup composite video signal from the VTR 300. If an operation mode is a normal record/reproduce mode, the composite video signal reproducer unit 270 reproduces the actual composite video signal from the VTR 300.

If a user selects a normal record/reproduce mode, the signal switch control unit 280 which determines an operation mode by generating a selection control signal, controls the input signal switch unit 230 and the output signal switch unit 260 so as to be respectively connected to the input and output connectors 201, 202 of the VTR 200 via the selection control signal. If a user selects a data backup mode, the signal switch control unit 280 controls the input signal switch unit 230 and the output signal switch unit 260 so as to be respectively connected to the backup composite video signal converter unit 220 and the backup composite video signal inverter 270.

Either the actual composite video signal or the backup composite video signal is selected in accordance with a selection control signal and recorded onto the video tape 300. Thus, function of backup data recording and the unique function of video tape recorder can be integrated into one.

The input signal switch unit 230 and the output signal switch unit 260 operate in the same operation mode, and include the above described signal switch unit. Thus, a data backup apparatus using a VTR where the function of recording backup data and the unique function of a VTR are integrated into one can be obtained.

The data backup apparatus of the present invention operates as follows.

If an application program for recording/reproducing backup data is executed in the host computer 100, names of the directories and files related to all the data of the host computer 100 are displayed onto a monitor connected to the host computer 100.

Then, a user selects backup data by clicking a mouse at the host computer 100, and transmits the selected backup data and then transmits record command to the VTR 200 through the communication cable 150 so as to record the backup data onto the video tape 300.

A signal discriminator unit 212 discriminates whether the signal input from the host computer 100 to the communication port 210 through the communication cable 150 is a mechanism control command or to-be-backup digital data.

If the input signal la determined as backup data, the backup composite video signal converter unit 220 adds horizontal and vertical synchronous signals to a bit stream of the to-be-backup digital data, thereby converting the digital data into a composite video signal.

If the input signal is determined as a mechanism control command, a central processing unit (CPU) 214 controls the mechanism driver unit 290 in accordance with the input command.

For example, if the mechanism control command applied from the host computer 100 is a reproduce command, the CPU 214 controls the mechanism driver unit 290 so that the data on the video tape can be reproduced similarly to the case where the reproduce button is pressed. If the mechanism control command is a record command, the CPU 214 controls the mechanism driver unit 290 so that the data can be recorded onto the video tape.

If the mechanism control command applied from the host computer 100 is a trick command, the CPU 214 controls the mechanism driver unit 290 so as to correspond to the relevant trick command.

Here, the signal discriminator 214 discriminates if the signal input from the host computer 100 is a mechanism control command or to-be-backup digital data, and simultaneously discriminates whether the mechanism control command is a reproduce, a record command, or a trick command.

Embodiment 2 of the composite video signal recorder unit 240 of the present invention will be explained with reference to FIG. 4.

The predetermined magnetic recording method as explained with reference to the composite video signal recorder unit 240 may use any known recording method of a video tape.

As for the home VTR, a composite video signal is separated into a luminance signal (Y) and a chrominance signal (C). High frequency components (5 MHz or higher) of the luminance signal are removed and thus the luminance signal is frequency modulated to the low carrier wave (4 to 10 MHz). The chrominance signal is low frequency converted (629 KHz for VHS method, 688 KHz for beta method, and 748 KHz for 8 mm method). Then, the two signals are multiplexed and recorded onto the video tape 300.

As for the broadcast VTR, a composite video signal is separated into a luminance signal (Y) and a chrominance signal (C). The luminance signal is recorded via a head for use in a luminance signal while the chrominance signal is separated again into R-Y and B-Y signals, frequency modulated, and multiplexed or recorded onto the video tape 300 via a head for use in a color difference signal by time sharing method.

However, if the frequency band for the luminance signal is extended up to those allocated for the chrominance signal, more amount of backup data can be recorded onto the video tape 300. Therefore, this point should be considered when designing the composite video signal recorder unit 240.

Figure 4:
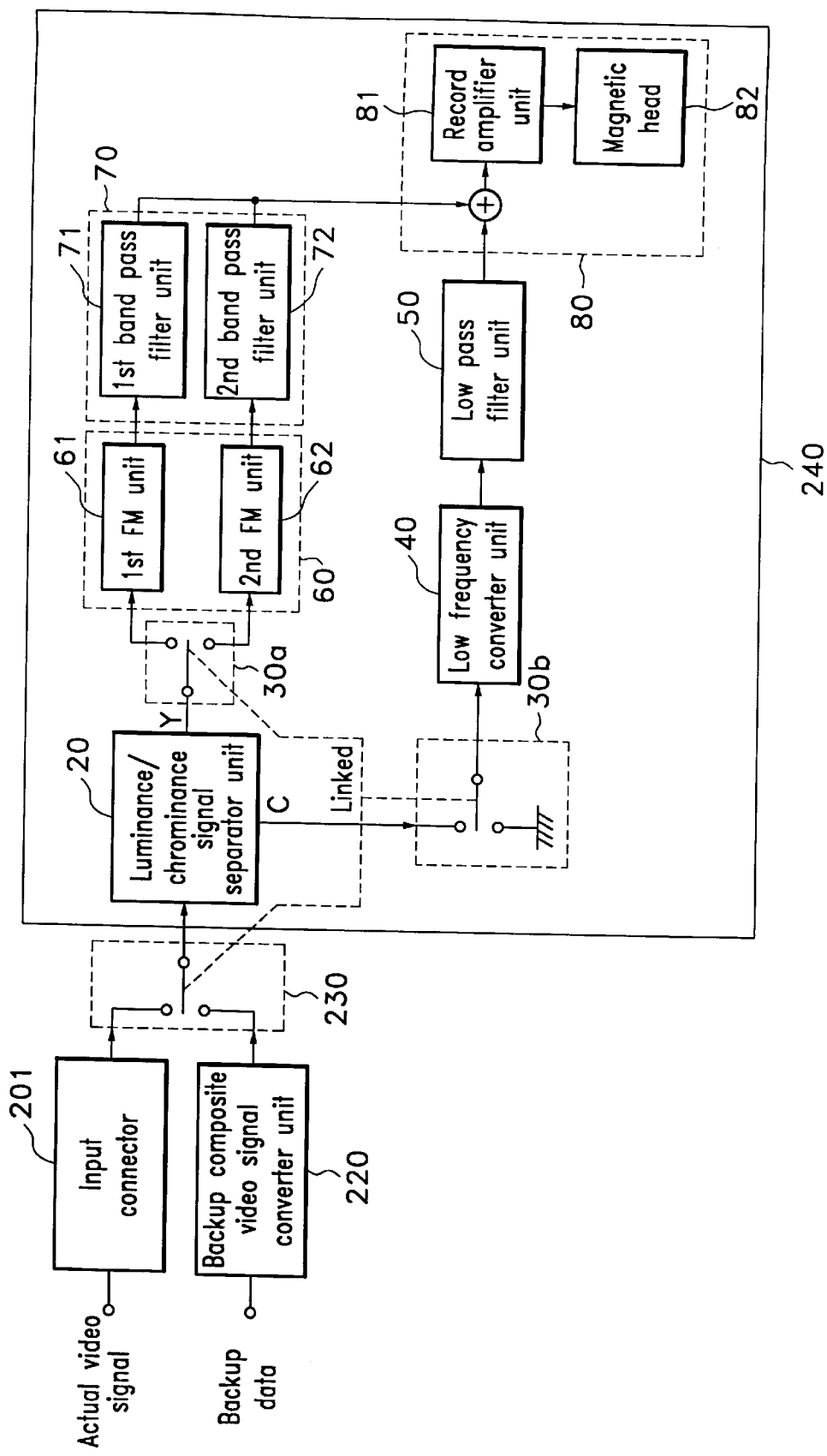
FIG. 4 is a block diagram showing a detailed structure of a composite video signal recorder unit according to embodiment 2 of the present invention.

As shown in FIG. 4, preferred embodiment of the composite video signal recorder unit 240 includes a luminance/chrominance signal separator unit 20, a low frequency converter unit 40, an FM unit 60, a band pass filter unit 70, and a magnetic recorder unit 80.

At this time, the FM unit 60 includes a first FM unit 61 and a second FM unit 62, and the band pass filter unit 70 includes a first band pans filter unit 71 and a second band pass filter unit 72 respectively corresponding to the first and second FM units 61, 62.

Figure 5:
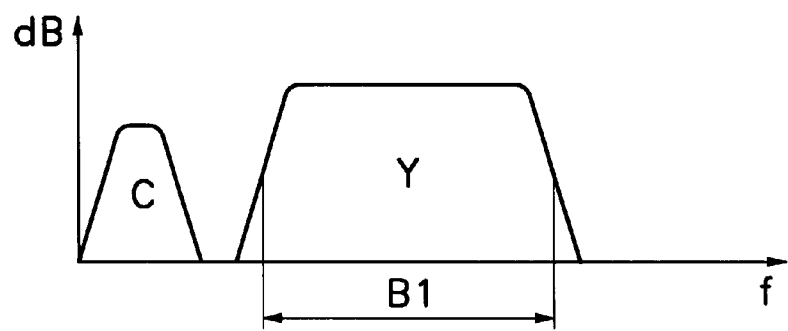
FIG. 5 shows a frequency band for a luminance signal in a normal record/reproduce mode according to the present invention.
Figure 6:
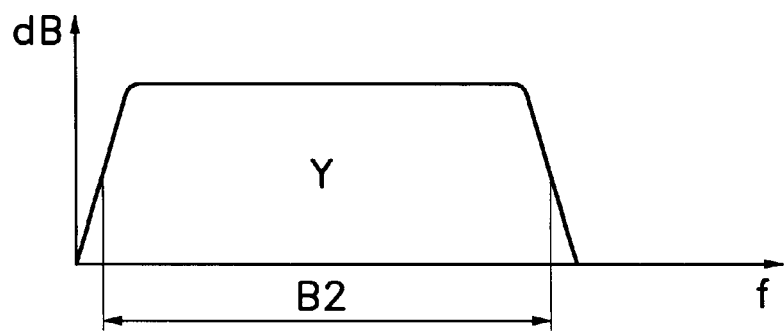
FIG. 6 shows a frequency band for a luminance signal in a data backup mode according to the present invention.

The first FM unit 61 and the first band pass filter unit 71 are intended to modulate the luminance signal to a first frequency band and filter the same in a normal record/reproduce mode. The second FM unit 62 and the second band pass filter unit 72 are intended to modulate the luminance signal to a second frequency band and filter the same In a data backup mode. FIGS. 5 and 6 respectively show frequency bands of each mode. As can be seen in a comparison between FIG. 5 and 6, a second frequency band (B2) for luminance signal (Y) in a data backup mode includes a low frequency band for chrominance signal (C) as well as a first frequency band (B1) for luminance signal (Y) in a normal record/reproduce mode.

A first switch 30a is inserted between the luminance/chrominance signal separator unit 20 and the FM unit 60, and switches in accordance with a mode selected by a user, Thus, luminance signal (Y) separated from the luminance/chrominance signal separator 20 is input to the first FM unit 61 or the second FM unit 62.

In addition, a second switch 30b is inserted between the luminance/chrominance signal separator unit 20 and the low frequency converter unit 40, and switches in accordance with a mode selected by a user. Thus, chrominance signal (C) separated from the luminance/chrominance signal separator unit 20 or a grounding voltage is input to the low frequency converter unit 40. The second switch 30b can be positioned between the low pass filter unit 50 and the magnetic recorder unit 80.

The first and second switches 30a, 30b are linked to the input signal switch unit 230 that switches in accordance with a mode selected by a user so that an actual video signal applied from an external device can be input to the luminance/chrominance signal separator 20 or a backup composite video signal output from the backup composite video signal converter unit 220 can be input to the luminance/chrominance signal separator 20. That is, the input signal switch unit 230 and the first and second switches 30a, 30b are linked and switched in accordance with a mode selected by a user.

The VTR 100 of the present invention can have various modes similarly to a conventional VTR, however, it has two basic modes relating to a signal recording onto the video tape 300. The two modes are a data backup mode for storing backup data and a normal record/reproduce mode for recording/reproducing a video signal.

The preferred embodiment of the composite video signal recorder unit 240 operates as follows, in accordance with a mode selected.

If a user selects a normal record/reproduce mode, the input signal switch unit 230 switches to the input connector 201 so that an actual video signal can be input from an external device to the luminance/chrominance signal separator unit 20 which separates the actual video signal into a luminance signal (Y) and a chrominance signal (C).

The luminance signal (Y) separated by the luminance/chrominance signal separator unit 20 is input to the first FM unit 61 as the first switch 30a switches to the first FM unit 61, being linked to the input signal switch unit 230. Then, the luminance signal (Y) is frequency modulated to the first frequency band (B1) by the first FM unit 61 and filtered to the first frequency band (B1) by the first band pass filter unit 71.

The chrominance signal (C) separated by the luminance/chrominance signal separator 20 is input to the low frequency converter unit 40 as the second switch 30b switches to the luminance/chrominance signal separator unit 20, being linked to the first switch 30a. Then, the chrominance signal (C) is low frequency converted to a low frequency band by the low frequency converter unit 40 and filtered to the low frequency band by the low pass filter unit 50.

The luminance signal (Y) thus filtered by the first band pass filter unit 71 and the chrominance signal (C) thus filtered by the low pass filter unit 50 are superposed, and amplified by a record amplifier unit 81, and recorded onto the video tape 300 via a magnetic head 82.

That is, in a normal record/reproduce mode, both the luminance signal (Y) and the chrominance signal (C) of the actual video signal are recorded onto the video tape 300.

If a user selects a data backup mode, the input signal switch unit 230 switches to the backup composite video signal converter unit 220. Thus, an output from the backup composite video signal converter 220 is input to the luminance/chrominance signal separator unit 20 which then separates the input backup composite video signal into a luminance signal (Y) and a chrominance signal (C), similarly with the case of the actual video signal.

The luminance signal (Y) output from the luminance/chrominance signal separator unit 20 is input to the second FM unit 62 as the first switch 30a switches to the second FM unit 62, being linked to the input signal switch unit 230. Then, the input luminance signal (Y) is frequency modulated to a second frequency band (B2) that includes the first frequency band (B1) and the low frequency band, and is filtered to the second frequency band (B2) by the second band pass filter unit 72. In other words, the luminance signal (Y) is frequency modulated and filtered to the second frequency band (B2) of which bandwidth is extended than in the case of the normal record/reproduce mode.

However, a grounding voltage not the chrominance signal (C) is input to the low frequency converter unit 40 as the second switch 30b switches to a ground being linked to the input signal switch unit 230 and the first switch 30a. Because the input voltage does not change when low frequency converted or filtered, the low frequency converter unit 40 and the low pass filter unit 50 output the grounding voltage. This means the chrominance signal (C) output from the luminance/chrominance signal separator unit 20 is removed. In practice, the chrominance signal (C) is not output from the luminance/chrominance signal separator unit 20 since the backup composite video signal does not include the chrominance signal (C). However, any noise signal that exists in the frequency band for chrominance signal (C) can be removed by the above-described method.

As a result, only the luminance signal (Y) filtered by the second band pass filter unit 72 is amplified by the record amplifier 81 and recorded onto the video tape 300 via the magnetic head 82.

That is, only the luminance signal (Y) of the backup composite video signal is recorded onto the video tape 300 at the normal record/reproduce mode. However, because the frequency band (B2) for luminance signal (Y) is extended up to the low frequency band for chrominance signal (C), more amount of backup data can be recorded onto the video tape 300.

Embodiment 3 of the composite video signal recording unit 240 of the present invention will be explained with reference to FIG 7.

Embodiment 3 is based on the fact that the chrominance signal component is not included into the backup composite video signal when data backup is performed. Here, the backup composite video signal is input directly to the second FM unit 62 without passing through the luminance/chrominance signal separator unit 20.

Figure 7:
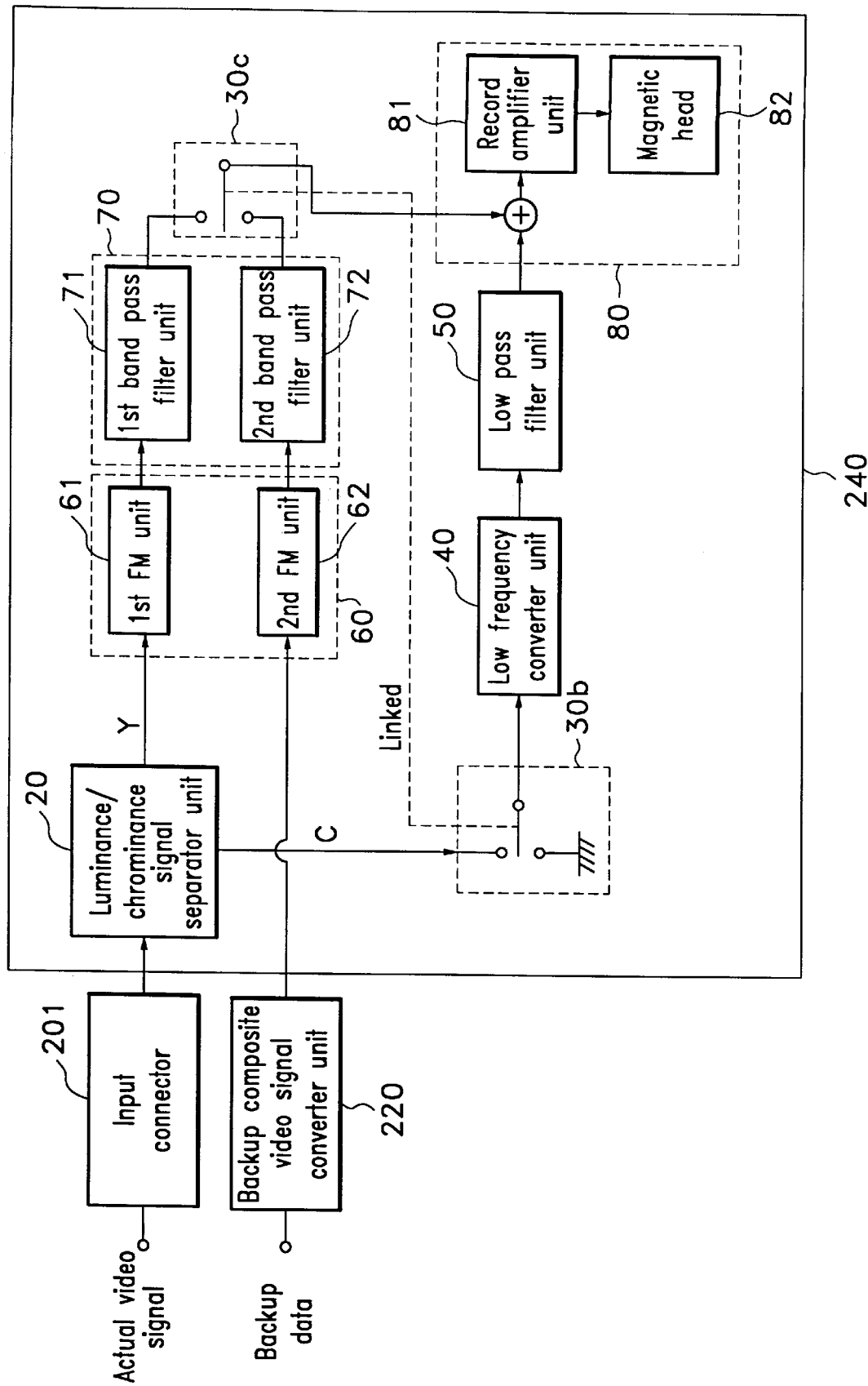
FIG. 7 is a block diagram showing a detailed structure of a composite video signal recorder unit according to embodiment 3 of the present invention.

FIG. 7 is a block diagram showing a detailed structure of a composite video signal recorder unit according to embodiment 3 of the present invention. Here, Components having the same function of those shown in FIG. 4 have the same reference numerals.

The composite video signal recorder unit 240 also includes the luminance/chrominance signal separator 20, the low frequency converter unit 40, the low pass filter unit 50, the FM unit 60, the band pass filter unit 70, and the magnetic recorder unit 80.

Here, the FM unit 60 includes the first and second FM units 61, 62, and the band pass filter unit 70 includes the first and second band pass filter units 71, 72 respectively corresponding to the first and second FM units 61, 62, The first FM unit 61 and luminance signal to a first frequency band and filter the same in a normal record/reproduce mode. The second FM unit 62 and the second band pass filter unit 72 are intended to modulate the luminance signal to a second frequency band and filter the same in a data backup mode.

Embodiment 3 of the present invention differs from other embodiments in that the first FM unit 61 directly receives an output from the luminance/chrominance signal separator unit 20 without switch process and the second FM unit 62 directly receives an output of the backup composite video signal converter unit 220 without switch process. The necessity of separating the output of the backup composite video signal converter unit 220 into a luminance signal and a chrominance signal is eliminated here because chrominance signal component is not included in the backup composite video signal when data backup is performed.

Thus a third switch 30c is inserted between the band pass filter unit 70 and the magnetic recorder unit 80, switches the first and second band pass filter units 71, 72 in accordance with a mode selected by the user, and synthesizes and output from the first or the second band pass filter unit 71 or 72 with those from the low pass filter unit 50, which will be recorded onto the magnetic recorder unit 80.

In addition, the second switch 30b is inserted between the luminance/chrominance signal separator unit 20 and the low frequency converter unit 40, and switches in accordance with a mode selected by a user. Thus, the chrominance signal (C) separated by the luminance/chrominance signal separator unit 20 or a grounding voltage is input to the low frequency converter unit 40. The second switch 30b can be positioned between the low pass filter unit 50 and the magnetic recorder unit 80.

The second and third switches 30b, 30 c are interlinked and switch in accordance with a mode selected by the user.

The composite video signal recorder unit 240 of embodiment 3 operates as follows.

If a user selects a normal record/reproduce mode, an actual video signal is input from an external device to the luminance/chrominance signal separator unit 20 and separated into a luminance signal (Y) and a chrominance signal (C).

The luminance signal (Y) separated by the luminance/chrominance signal separator 20 is input to the first FM unit 61, and frequency modulated to the first frequency band (B1) by the first FM unit 61 and filtered to the first frequency band (B1) by the first band pass filter unit 71.

The chrominance signal (C) separated by the luminance/chrominance signal separator 20 is input to the low frequency converter unit 40 as the second switch 30b switches to the luminance/chrominance signal separator unit 20. Then, the chrominance signal (C) is low frequency converted to a low frequency band by the low frequency converter unit 40 and filtered to the low frequency band by the low pass filter unit 50.

As the third switch 30c inserted between the band pass filter unit 70 and the magnetic recorder unit 80 switches to the first band pass filter unit 71, the luminance signal (Y) filtered by the first band pass filter unit 71 and the chrominance signal (C) filtered by the low pass filter unit 50 are superposed, and amplified by a record amplifier unit 81, and recorded onto the video tape 300 via the magnetic head 82.

That is, in a normal record/reproduce mode, both the luminance signal (Y) and the chrominance signal (C) of the actual video signal are recorded onto the video tape 300.

If a user selects a data backup mode, the backup composite video signal converter unit 220 generates a backup composite video signal where horizontal and vertical synchronous signals are added to the backup data transmitted from the hoot computer 100.

The output from the backup composite video signal converter unit 220 is input to the second FM unit 62, and is frequency modulated to the second frequency band (B2) that includes the first frequency band (B1) and the low frequency band, and is filtered to the second frequency band (B2) by the second band pass filter unit 72. In other words, the luminance signal (Y) is frequency modulated and filtered to the second frequency band (92) of which bandwidth is extended than in the case of the normal record/reproduce mode.

At this time, the third switch 30c inserted between the band pass filter unit 70 and the magnetic recorder unit 80 switches to the second band pass filter unit 72.

However, a grounding voltage not the chrominance signal (C) is input to the low frequency converter unit 40 as the second switch 30b switches to a ground being linked to the third switch 30c. Because the input voltage does not change when low frequency converted or filtered, the low frequency converter unit 40 and the low pass filter unit 50 output the grounding voltage. This means the chrominance signal (C) output from the luminance/chrominance signal separator unit 20 is removed.

As a result, only the luminance signal (Y) filtered by the second band pass filter unit 72 is amplified by the record amplifier 81 and recorded onto the video tape 300 via the magnetic head 82.

That is, only the luminance signal (Y) of the backup composite video signal is recorded onto the video tape 300 at the normal record/reproduce mode. However, because the frequency band (B2) for luminance signal (Y) is extended up to the low frequency band for chrominance signal (C), more amount of backup data can be recorded onto the video tape 300.

Figure 8:
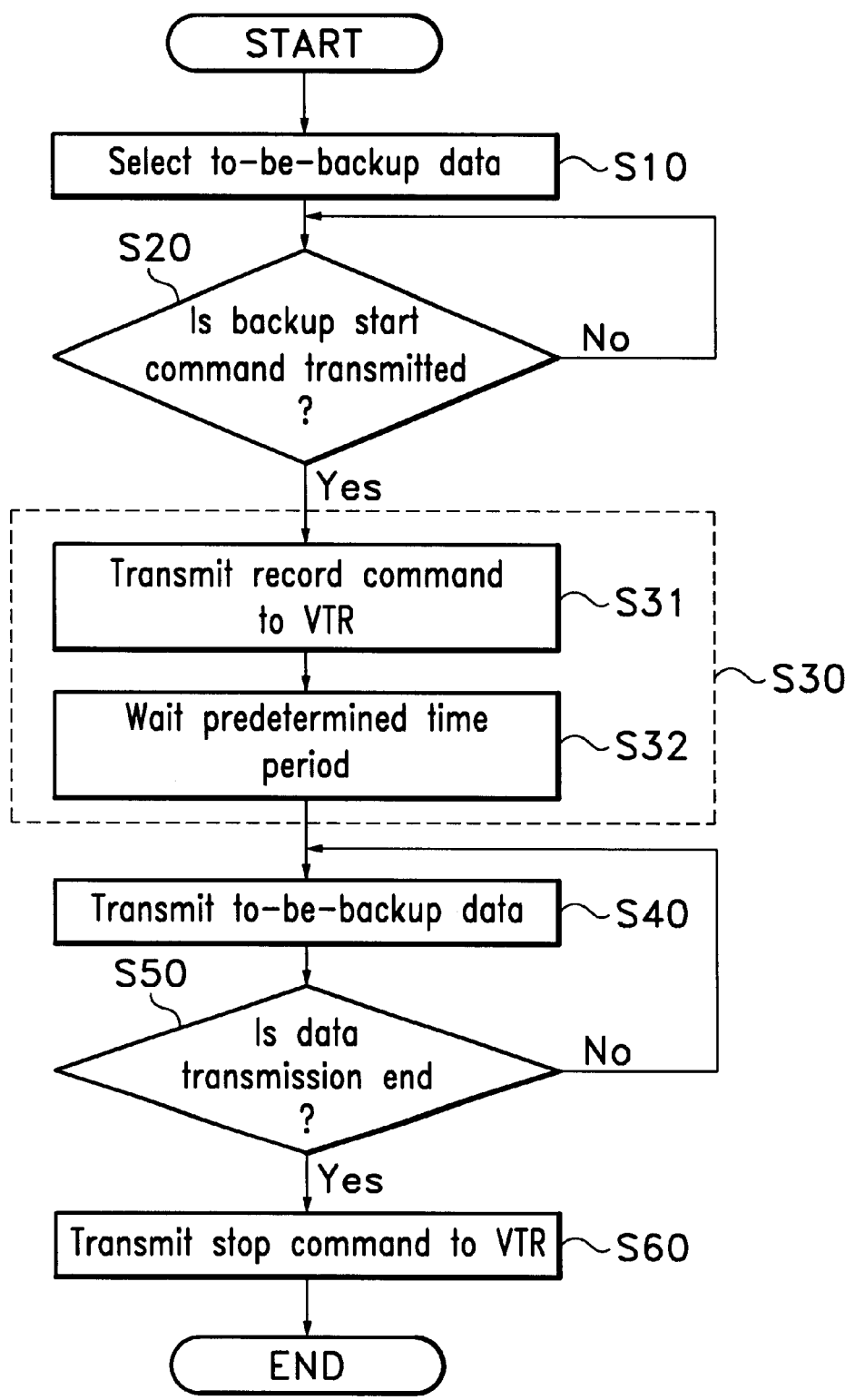
FIG. 8 is a flow diagram showing a data backup method using a VTR according to embodiment 4 of the present invention.

FIG. 8 is a flow diagram showing data backup method using a VTR according to embodiment 4 of the present invention.

First the host computer 100 operates an application program related to the backup data.

Subsequently, names of all the directories and files in a hard disk of the host computer 100 are displayed onto a monitor. Then, a user selects the to-be-backup directory or file by clicking it at step S10.

At step S20, it is determined whether a backup start command is transmitted from the host computer 100 to transmit to-be-backup files to the VTR 200 having a data backup function.

At step S30, if the backup start command is determined as being transmitted at step S20, a record command is transmitted from the host computer 100 to the VTR 200 through the communication cable 150, thus operates the VTR 200 in a record mode. In detail, the record command transmitted to the VTR 200 through the communication cable 150 is transmitted again to the CPU 214 via the signal discriminator unit 212 so as to control the mechanism driver unit 290. Thus, the VTR 200 is switched to the record mode.

The CPU 214 controls the mechanism driver unit 290 so as to operate the VTR 200 and record backup data onto the video tape similarly to the case where a user manually operates a record button. Thus, the backup data can be recorded onto the video tape without pressing the record button on a control panel of the VTR 200.

It takes time to switch to an operation mode of the VTR 200. Generally, the normal record/reproduce mode starts within five seconds after the record/reproduce button of the VTR 200 pressed.

At step S40, the host computer 100 transmits the backup data by turns to the tape recorder 200 through the communication cable 150 so as to record the backup data onto the video tape 300. At this time, the tape number for discriminating various backup video tapes, backup file information, and index data indicating where a certain file is located in the video tape, are recorded onto a predetermined place of the video tape.

At step S50, it is determined whether the backup data transmission is finished. If the transmission is finished, the host computer 100 transmits 'stop' command to the VTR 200 through the communication cable 150 so as to stop the operation of the VTR 200, at step S60.

Figure 9:
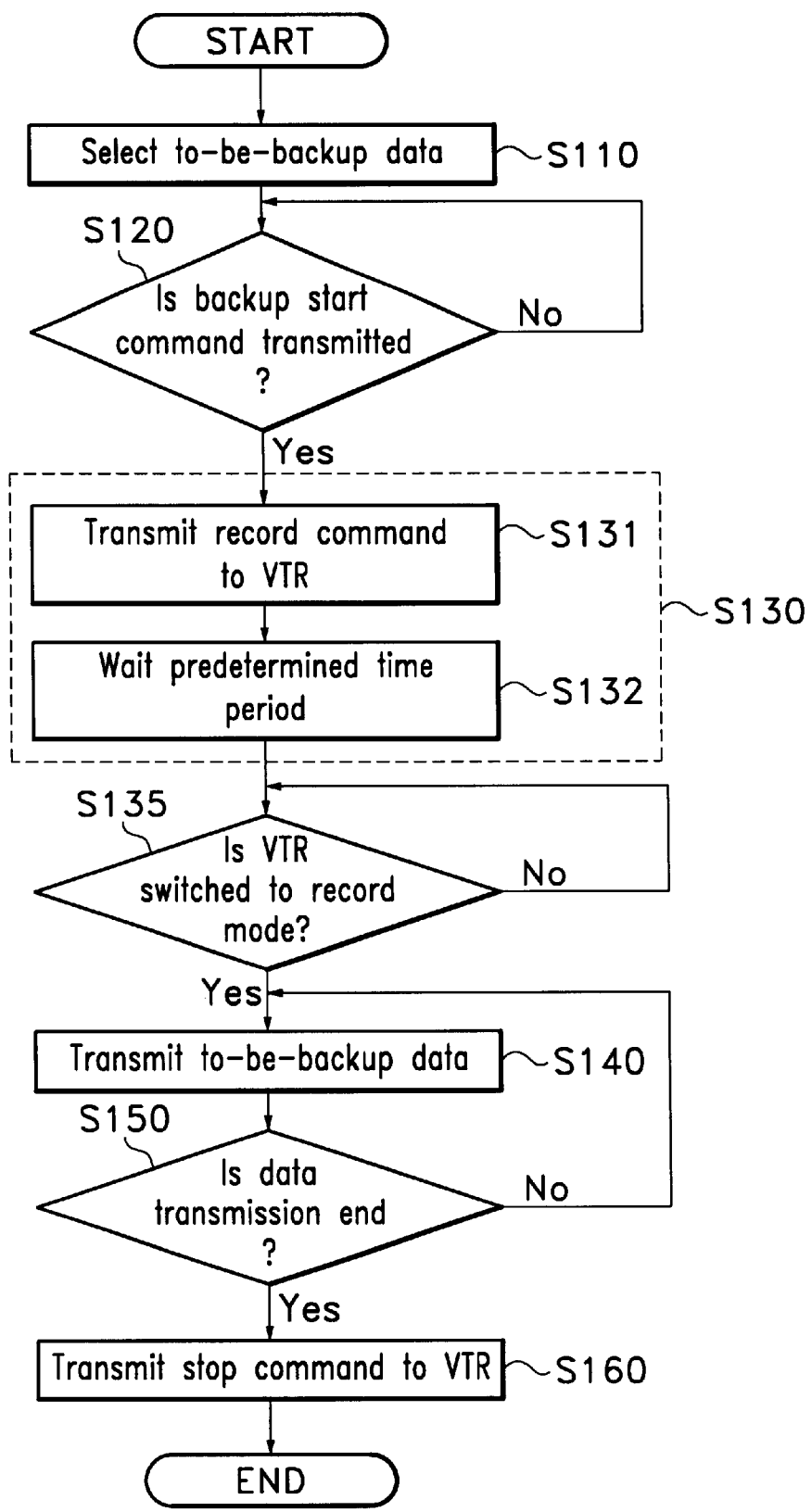
FIG. 9 is a flow diagram showing a backup data recording method using a VTR according to embodiment 5 of the present invention.

FIG. 9 is a flow diagram showing a backup data recording method using a VTR according to embodiment 5 of the present invention.

Similarly to those shown in FIG. 8, the host computer 100 operates an application program for data backup. Then, names of all the directories and files stored in a hard disk of the host computer 100 are displayed onto a monitor.

At step S110, a user selects to-be-backup file or directory.

At step S120, it is determined whether a backup start command is transmitted from the host computer 100 to transmit the to-be-backup file to the VTR 200.

If it is determined that the backup start command is transmitted at step S120, the host computer 100 transmits a record command to the VTR 200 through the communication cable 150. Here, the record command turns on the record button of the VTR 200 where the recordable video tape 300 is provided.

The CPU 214 controls the mechanism driver unit 290 so as to operate the VTR 200 and record the backup data onto the video tape similarly to the case where a user manually operates a record button. Thus, the backup data can be recorded onto the video tape without pressing the record button on a control panel of the VTR 200.

The record command transmitted to the VTR 200 through the communication cable 150 is transmitted to the CPU 214 so as to control the mechanism driver unit 290. Thus, the VTR 200 is switched to a record mode. Generally, it takes time to switch an operation mode of a VTR. Therefore, a standby for a predetermined time period is required here.

At step S135, the CPU 214 of the VTR 200 recognizes that a record mode starts and transmits a record mode start signal to the host computer 100 through a communication cable 150. Then, the host computer 100 determines whether the VTR 200 is switched to the record mode.

IF it is determined that the VTR 200 is switched to the record mode at step S135, the host computer 100 transmits the backup data by turns to the VTR 200 through the communication cable 150 so as to record the backup data onto the video tape 300, at step S140. Here, similarly to those shown in FIG. 8, the tape number for discriminating various backup video tapes, backup file information, and index data indicating where a certain file is located in the video tape, are recorded onto a predetermined place of the video tape.

At step S150, it is determined whether the backup data transmission is finished or not. If so, the host computer 100 transmits 'stop' command to the VTR 200 through the communication cable 150 so as to stop the operation of the VTR 200, at step S160.

Figure 10:
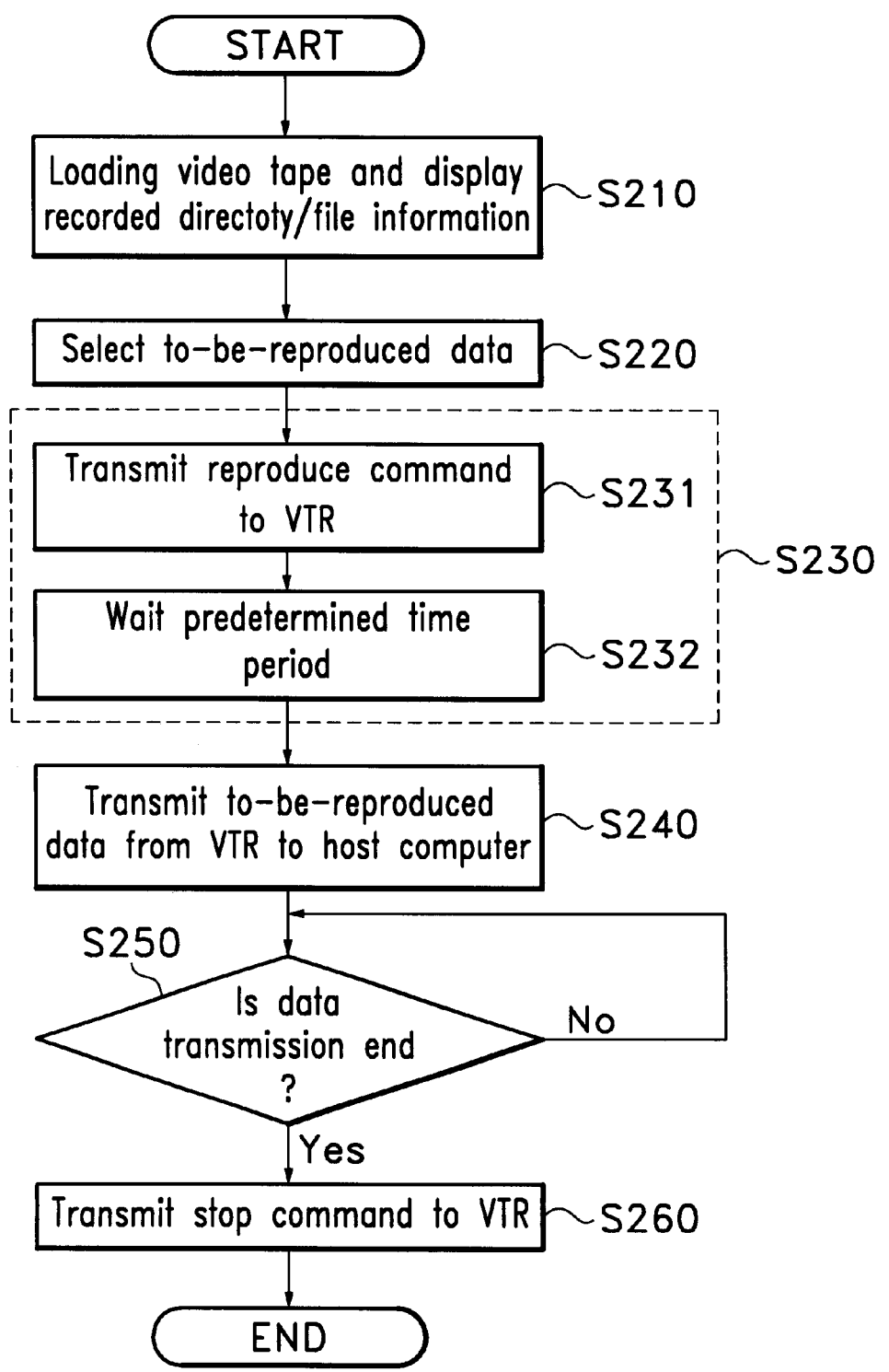
FIG. 10 is a flow diagram showing a backup data reproducing method using a VTR according to embodiment 6 of the present invention.

FIG. 10 is a flow diagram showing a backup data reproducing method using a VTR according to embodiment 6 of the present invention.

As shown in FIG. 10, at step S210, the host computer 100 executes an application program for reproducing data and displays onto a monitor the directory and file information of the digital data recorded onto the video tape 300. To display directory and file information, a log file generated in the host computer 100 when the data backup is performed, or a copy of the log file recorded onto the initial portion of the video tape 300 and which is transmitted from the VTR 200,. can be used as the application program.

If the copy of the log file is used, the host computer 100 transmits a rewind command to the video tape 300 so as to rewind the video tape 300, and a reproduce command so as to receive the copy of the log file recorded onto the initial portion of the video tape 300 from the VTR 200. Alternatively, the host computer 100 receives read data for the tape data recorded onto a control track of the video tape 300 from the VTR 200.

At step S220, a user selects the directory and file to be reproduced by clicking on a screen of the hoot computer 100.

At step S230, the host computer 100 transmits reproduce command to the VTR 200 through the communication cable 150 and operates the VTR 200 in reproduce mode so as to reproduce the selected directory and file. Here, the reproduce command transmitted to the VTR 200 through the communication cable 150 is transmitted to the CPU 214 via the signal discriminator unit 212 so as to control the mechanism driver unit 290. Thus, the VTR 200 is switched to a reproduce mode.

The CPU 214 controls the mechanism driver unit 290 so as to reproduce the video tape 300 similarly to the case where a user manually operates a reproduce button. Thus, the mechanism driver unit 290 can operates in a reproduce mode without pressing the reproduce button on a control panel of the VTR 200.

Generally, it takes time to switch an operation mode of a VTR. Therefore, a standby for a predetermined time period is required here.

At step S240, the host computer 100 receives by turns the to-be-reproduced data from the VTR 200 through the communication cable 150 and stores the same into the hard disk or other auxiliary memory device.

At step S250, it is determined whether the backup data transmission is finished. If the transmission is finished, the host computer 100 transmits 'stop' command to the VTR 200 through the communication cable 150 so as to stop the operation of the VTR 200, at step S260.

FIG. 11 is a flow diagram showing a data backup method using VTR according to embodiment 7 of the present invention.

The data backup method using the VTR where the digital data of the host computer 100 can be recorded onto the video tape 300, will be explained. First, when a user input is applied at step S205, it is determined whether the operation mode is a data backup mode for backup of the digital data (i.e., backup data) of the host computer onto the video tape 300, or a normal record/reproduce mode for recording/reproducing a composite video signal of a VTR, at step S210.

If the operation mode is a data backup mode, it is determined whether the user input is a record or a reproduce request, at step S220.

If the user input is a record request, digital data is input from the host computer 100 and horizontal and vertical synchronous signals are added to a bit stream of the digital data, thereby generating a backup composite video signal, at step S230.

Then, from among the backup composite signal and the actual composite video signal input by an input connector of the VTR, the backup composite video signal is selected, at step S240.

The selected backup composite video signal is input and recorded onto the video tape 300 in accordance with a predetermined magnetic recording method, at step S250.

If the user input is a reproduce request, the backup composite video signal is reproduced from the video tape in accordance with a predetermined reproducing method, at step S260.

Then, the reproduced backup composite video signal is selectively output to a backup composite video signal inverter unit for inverting a composite video signal into digital data.

That is, if a normal record/reproduce made is selected, the reproduced composite video signal is applied to an output connector of the VTR, and if a data backup mode is selected, the reproduced composite video signal is selected so as to be applied to a backup composite video signal inverter unit. Thus, the reproduced composite video signal is selected so as to be applied to the backup composite video signal inverter unit, at step S270.

The selected composite video signal is input and inverted into digital data by removing the horizontal and vertical synchronous signals contained therein, and the digital data is input to the host computer, at step S280.

If the operation mode is determined as a normal record/reproduce mode at step S210, the unique record/reproduce function of the VTR is performed in accordance with the user input, at step S290.

As described above, the present invention provides a data backup apparatus which can be easily installed, moved and does not require an additional space for installation. In addition, the data backup apparatus can be operated in record or reproduce mode without a user's manual operation. Thus, the data backup system having an enhanced efficiency in use can be widely used.

An actually effective luminance signal from among the backup composite video signals obtained by modulating the to-be-backup data when data backup is performed is frequency modulated to the frequency band extended to those corresponding to a chrominance signal, and is recorded. Thus, further more amount of backup data can be recorded onto a video tape while an error which may be caused by a limited bandwidth can be significantly reduced.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A data backup video tape recorder (VTR) in which digital data of a host computer is recorded as a composite video signal onto a video tape and reproduced as a composite signal from a video tape, said data backup VTR comprising:

a communication unit for connecting with said host computer;

a backup composite video signal converter unit for receiving said digital data from said host computer through said communication unit, converting said digital data into the composite video signal by adding horizontal and vertical synchronous signals thereto, and generating a backup composite video signal;

an input signal switch unit for selectively switching said backup composite video signal input from one of said backup composite video signal converter unit and an actual composite video signal input via a,,i input connector of said VTR, said switching being done in accordance with a selection control signal; and a composite video signal recorder unit for receiving an output from said input signal switch unit and recording said output onto said video tape in accordance with a magnetic recording method.

2. The data backup video tape recorder (VTR) according to claim 1, further comprising:

a composite video signal reproducer unit for reproducing said composite video signal from said video tape in accordance with a magnetic reproducing method;

an output signal switch unit for selectively switching an output of said composite video signal reproducer unit in accordance with said selection control signal;

a backup composite video signal inverter unit for receiving an output of said output signal switch unit, inverting said output into digital data by removing said horizontal and vertical synchronous signals, and outputting said digital data to said host computer through said communication unit; and a microcomputer for controlling said input signal switch unit and said output signal switch unit said input signal switch unit being connected to said input connector and said output signal unit being connected to said output connector of said VTR in accordance with said selection control signal if one of a normal record and reproduce mode is selected by user input, and controlling said input signal switch unit and said output signal switch unit in accordance with said selection control signal if a data backup mode is selected by said user input.

3. The data backup video tape recorder (VTR) according to claim 1, wherein said composite video signal recorder unit further comprises:

a signal separator unit for receiving said output of said input signal switch unit and separating said output into a luminance signal (Y) and a chrominance signal (C);

a frequency modulator unit for frequency modulating said luminance signal (Y) to a selected frequency band;

a low frequency converter unit for converting said chrominance signal (C) to a low frequency band;

a chrominance signal remover unit for removing said chrominance signal in accordance with a mode selected by a user; and a magnetic recorder unit for superposing and recording said frequency modulated luminance signal and said low frequency converted chrominance signal onto said video tape;

wherein said frequency modulator unit modulates a frequency of said luminance signal to a one of a first frequency band and to a second frequency band that includes said low frequency band and said first frequency band.

4. The data backup video tape recorder (VTR) according to claim 3, wherein said frequency modulator unit further comprises:

a first frequency modulator unit for modulating a frequency of said luminance signal to said first frequency band;

a second frequency modulator unit for modulating the frequency of said luminance signal to said second frequency band; and a first switch unit for switching said luminance signal to be input to one of said first and second frequency modulator unit in accordance with an operation mode selected by said user.

5. The data backup video tape recorder (VTR) according to claim 4, further comprising a band pass filter unit for filtering said luminance signal output from said frequency modulator unit to said one of said first and second frequency band in accordance with said mode selected by said user.

6. The data backup video tape recorder (VTR) according to claim 5, wherein said band pass filter unit further comprises:

a first band pass filter unit for filtering said luminance signal output from said first frequency modulator unit to said first frequency band; and a second band pass filter unit for filtering said luminance signal output from said second frequency modulator unit to said second frequency band.

7. The data backup video tape recorder (VTR) according to claim 1, wherein said composite video signal recorder unit further comprises:

a signal separator unit which receives said actual composite video signal and separates said actual composite video signal into an actual luminance signal and an actual chrominance signal;

a first frequency modulator unit which modulates a frequency of said actual luminance signal to a first frequency band having a selected frequency band;

a first switch unit for switching to an output of said signal separator unit if a normal record or reproduce mode for recording or reproducing said actual video signal is selected, and switches to a ground if a data backup mode for storing said digital data output from said host computer is selected;

a low frequency converter unit for converting said actual chrominance signal to a low frequency band as said first switch unit switches to said output of said signal separator unit;

a second frequency modulator unit for receiving said backup composite video signal and modulates the frequency of said backup composite video signal to a second frequency band that includes both said first frequency band and said low frequency band;

a second switch unit for switching to an output of said first frequency modulator unit or to an output of said second frequency modulator unit in accordance with said one of normal record and reproduce mode or said data backup mode; and a magnetic recorder unit for superposing and recording outputs of said second switch unit and said low frequency converter unit onto said video tape.

8. The data backup video tape recorder (VTR) according to claim 7, further comprising a first band pass filter unit between said first frequency modulator unit and said first band pass filter unit for band pass filtering an output of said first frequency modulator unit to said first frequency band.

9. The data backup video tape recorder (VTR) according to claim 7, further comprising a second band pass filter unit between said second frequency modulator unit and said second band pass filter unit for band pass filtering an output of said second frequency modulator unit to said second frequency band.

10. The data backup video tape recorder (VTR) according to claim 7, further comprising a low pass filter unit for low pass filtering an output of said low frequency converter unit to said frequency band.

11. The data backup video tape recorder (VTR) according to claim 1, further comprising:

a signal discriminator unit for discriminating whether a predetermined signal input from said host computer through said communication unit is one of a mechanism control command and said digital data to be backed up, and discriminating again whether said mechanism control command is one of a record, a reproduce, and a trick command; and a mechanism driver unit for driving a mechanism of said VTR in accordance with said discriminated mechanism control command.

12. A data backup method using a VTR in which digital data of a host computer is recorded as a composite video signal onto a video tape and reproduced as a composite signal from a video tape, said data backup method comprising the steps of:

determining whether an operation mode is a data backup mode for backup of said digital data of said host computer onto said video tape, or a normal record or reproduce mode for one of recording and reproducing a unique composite video signal of said VTR;

discriminating whether a user input is one of a record and a reproduce request if said operation mode is determined as said data back mode;

if said user input is discriminated as said record request, generating a backup composite video by adding horizontal and vertical synchronous signals to said digital data received from said host computer and converting said digital data onto said composite video signal;

switching an input signal by selecting and switching to said backup composite signal from among said backup composite video signal and an actual composite video signal input via an input connector of said VTR; and recording said backup composite video signal onto said video tape in accordance with a magnetic recording method.

13. The data backup method using a VTR according to claim 12, further comprising the steps of:

reproducing a composite video signal from said video tape in accordance with a magnetic reproducing method if said user input is discriminated as said reproduce request for reproducing said digital data;

switching said reproduced composite video signal to a backup composite video signal inverter unit for inverting said composite video signal into said digital data, and outputting a result;

inverting said switched composite video signal into said digital data by removing said horizontal and vertical synchronous signals contained therein, and providing said host computer with said digital data; and performing a unique record or reproduce function of said VTR in accordance with a user request if said operation mode is determined as said normal record or reproduce mode.

14. A backup data recording or reproducing method using a VTR in which digital data from a host computer is recorded as a composite video signal onto a video tape and reproduced as a composite signal from a video tape of said VTR, said backup data recording or reproducing method comprising the steps of:

selecting digital data to be backup;

determining whether a backup start command for transmitting said digital data to said VTR is transmitted from said host computer;

waiting a predetermined time period until a record command is transmitted to said VTR, a mechanism driver unit of said VTR operates to be set to a record mode if said backup start command is determined as being transmitted; and recording said digital data onto said video tape of said VTR by transmitting said digital data from said host computer.

15. The backup data recording or reproducing method according to claim 14, further comprising the step of transmitting a stop command from said host computer to said VTR, after said step of recording said digital data is completed.

16. The backup data recording or reproducing method according to claim 14, further comprising the step of confirming whether an operation mode of said VTR is switched to said record mode and transmitting a confirm signal to said host computer, after said step of waiting.

17. The backup data recording or reproducing method according to claim 14, further comprising the steps of:

selecting backup data recorded onto said video tape in said host computer;

waiting a predetermined time period until said VTR is set to a reproduce mode after said host computer transmits a reproduce command to said VTR to reproduce said selected backup data; and transmitting by said VTR said selected backup data to said host computer.

18. The backup data recording or reproducing method according to claim 17, further comprising the step of confirming whether an operation mode of said VTR is switched to said reproduce mode and transmitting a confirm signal to said host computer.

19. The backup data recording or reproducing method according to claim 17, further comprising the step of transmitting a stop command said host computer to said VTR when said transmission of said selected backup data is completed.

* * * * *